US008442598B2

(12) United States Patent
Park

(10) Patent No.: US 8,442,598 B2
(45) Date of Patent: May 14, 2013

(54) PORTABLE TERMINAL WITH CAMERA LENS ASSEMBLY

(75) Inventor: Kwan-Bo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1386 days.

(21) Appl. No.: 11/696,423

(22) Filed: Apr. 4, 2007

(65) Prior Publication Data

US 2008/0020809 A1 Jan. 24, 2008

(30) Foreign Application Priority Data

Jul. 24, 2006 (KR) ........................ 10-2006-0069162

(51) Int. Cl.
*H04M 1/00* (2006.01)
*H04N 5/225* (2006.01)

(52) U.S. Cl.
USPC ................. 455/575.3; 455/556.1; 348/360; 348/373; 348/333.06

(58) Field of Classification Search ............... 455/575.1, 455/575.3, 556.1, 550.1; 348/333.03, 333.01, 348/360, 373–376, 33.06; 359/704
See application file for complete search history.

(56) References Cited

U.S. PATENT DOCUMENTS

| | | | | |
|---|---|---|---|---|
| 7,362,513 B2* | 4/2008 | Kim et al. | ...................... | 359/704 |
| 2002/0187818 A1* | 12/2002 | Kang | ............................ | 455/575 |
| 2004/0009790 A1* | 1/2004 | Im | .............................. | 455/556.1 |
| 2005/0094025 A1* | 5/2005 | Yoon | .............................. | 348/360 |
| 2006/0268142 A1* | 11/2006 | Yi et al. | ................... | 348/333.06 |

FOREIGN PATENT DOCUMENTS

| | | |
|---|---|---|
| EP | 1381207 | 1/2004 |
| KR | 1020050035721 | 4/2005 |
| KR | 1020050118008 | 12/2005 |
| KR | 1020060032721 | 4/2006 |
| KR | 1020060059656 | 6/2006 |

\* cited by examiner

*Primary Examiner* — Kent Chang
*Assistant Examiner* — Kuo Woo
(74) *Attorney, Agent, or Firm* — H.C. Park & Associates, PLC

(57) ABSTRACT

A portable terminal with a camera lens assembly is disclosed. The portable terminal includes a receiving groove, a lens housing rotatably disposed in the receiving groove, a frictional piece provided in the lens housing, and a frictional projection provided at an end of the frictional piece. The frictional projection contacts and rubs against an inside wall of the receiving groove when the lens housing rotates.

6 Claims, 4 Drawing Sheets

PORTABLE TERMINAL WITH CAMERA LENS ASSEMBLY

CROSS REFERENCE TO RELATED APPLICATIONS

This application claims priority from and the benefit of Korean Patent Application No. 2006-0069162, filed on Jul. 24, 2006, which is hereby incorporated by reference for all purposes as if fully set forth herein.

BACKGROUND OF THE INVENTION

1. Field of the Invention

The present invention relates to a portable terminal, and in particular, to a portable terminal with a camera lens assembly.

2. Discussion of the Background

Typically, a portable terminal is an appliance for providing user-to-user or user-to-service provider wireless communication through a base station for mobile communication. The base station offers a sound communication service, a short messaging service, a mobile banking service, and various other service content, such as TV programs, on-line games, and Videos On Demand (VOD), to users through portable terminals.

Classes of portable terminals include bar-type terminals, which incorporate a communication circuit and input and output devices such as a transmitter unit and a receiver unit in a single housing, flip-type terminals, which have flip covers connected to bar-type terminals, and folder-type terminals, in which a pair of housings are rotatable so as to open or close the terminal and input and output devices distributed on the housings. Recently, sliding-type terminals have also appeared. Efforts are being concentrated on improving the portability and convenience of portable terminals, as well as on meeting the demands of various users' tastes for such portable terminals.

In addition, mobile communication services, including banking services, VOD, and digital multimedia broadcasting (DMB), which are offered to portable terminals through on-line technology, have been diversified. Diversification of mobile communication services has been realized due to the generalized use of portable terminals and the commercialization of services, which supply various content through portable terminals.

Further, as information communication technologies have become integrated, the functions of portable terminals as communication appliances and also as composite appliances, which can be used as photographing machines or a storage mediums, have been strengthened. Among these composite functions, a photographing function, which can be implemented by mounting a camera lens assembly in a portable terminal, has been identified as an essential function for a portable terminal.

A camera lens assembly may be classified as fixed-type or rotary-type. A fixed-type camera lens assembly is mounted on a side of a terminal housing, thereby preventing the camera lens assembly from being damaged by an external impact. However, a fixed type camera lens is inconvenient because the orientation of the terminal may require adjustment each time a photograph is taken in order for the camera lens to be directed toward the object being photographed. A rotary-type camera lens assembly is mounted on a terminal housing such that it rotatable. Therefore, a rotary-type camera lens assembly is advantageous because it is possible to take photographs in various directions by rotating the lens housing without adjusting the orientation of the terminal. However, a rotary-type camera lens assembly may lack stability at the time of photographing, as compared to a fixed-type camera lens assembly, because it is vulnerable to movement of the lens housing. In addition, although the rotary-type camera lens assembly is advantageous because it is possible to take photographs in various directions, it may be difficult for a user to recognize the photographing direction of the lens housing.

SUMMARY OF THE INVENTION

The present invention provides a portable terminal with a camera lens assembly which may assure stability in photographing by limiting the movement of the lens housing. The present invention also provides a portable terminal that may make it easier to photograph in various directions and allow the photographing direction of a lens housing to be easily recognized.

Additional features of the invention will be set forth in the description which follows, and in part will be apparent from the description, or may be learned by practice of the invention.

The present invention discloses a portable terminal with a camera lens assembly including a receiving groove disposed in the portable terminal, a lens housing rotatably disposed in the receiving groove, a frictional piece provided in the lens housing, and a frictional projection provided at an end of the frictional piece. The frictional projection contacts a wall of the receiving groove when the lens housing rotates.

It is to be understood that both the foregoing and general descriptions and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention, and together with description serve to explain the principles of the invention.

DETAILED DESCRIPTION OF THE ILLUSTRATED EMBODIMENTS

Figure 1:
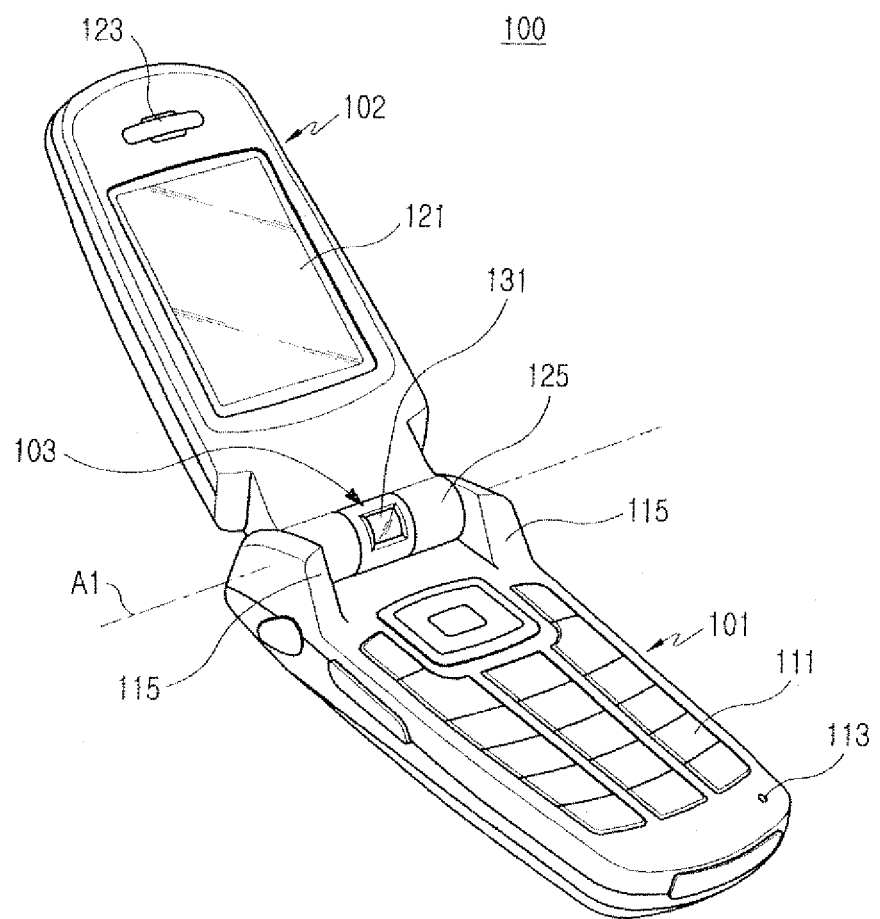
FIG. 1 is a perspective view showing a portable terminal with a camera lens assembly according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
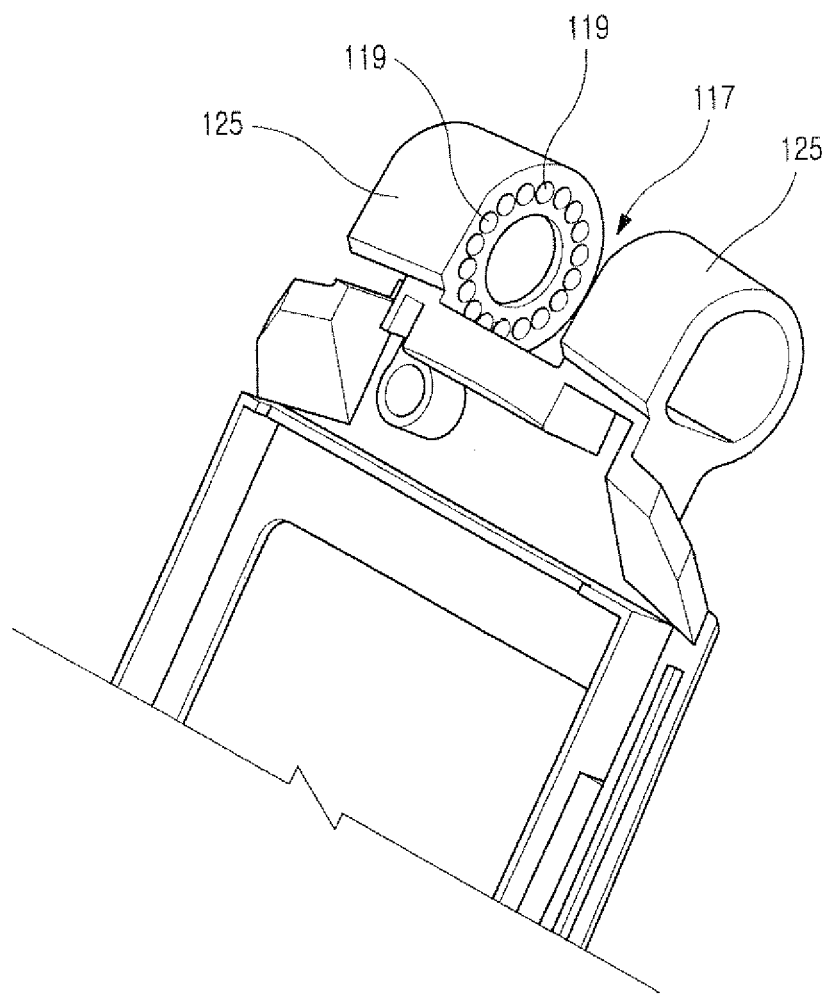
FIG. 2 is a perspective view showing the second housing of the portable terminal shown in FIG. 1.
Figure 3:
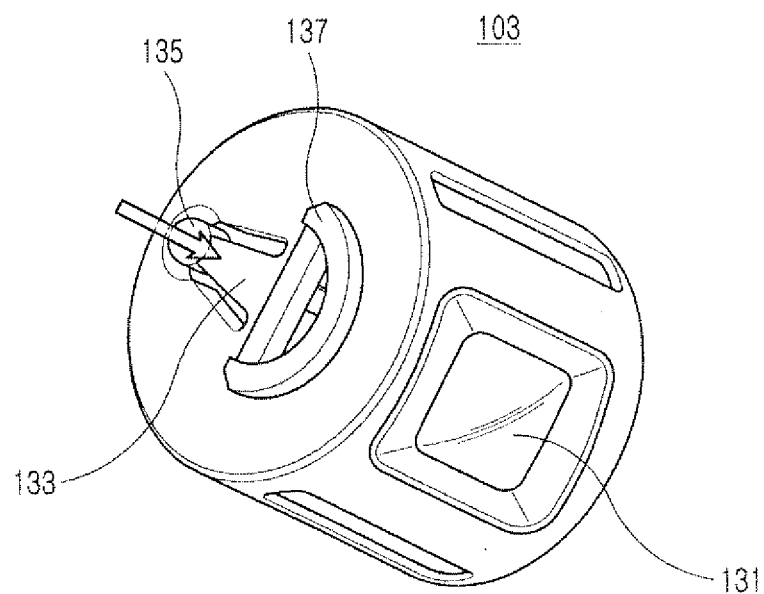
FIG. 3 is a perspective view showing the lens housing of the camera lens assembly of the portable terminal shown in FIG. 1.
Figure 4:
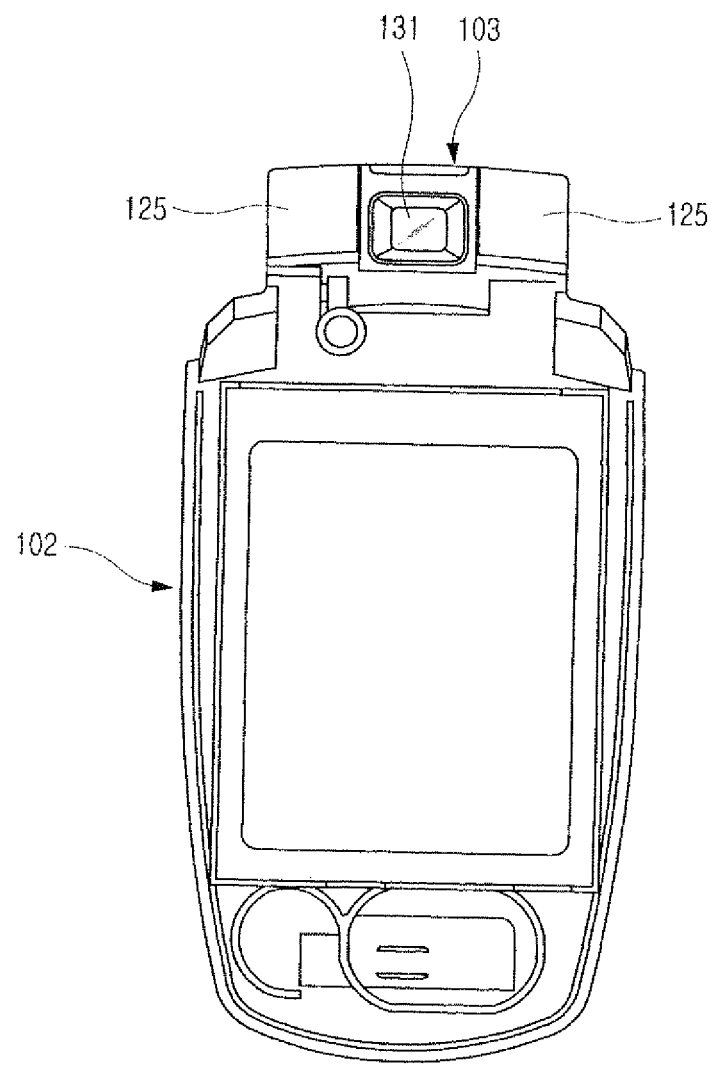
FIG. 4 is a front view showing the second lens housing of the portable terminal shown in FIG. 1 when the lens housing is assembled in the second housing.

FIG. 1 is a perspective view showing a portable terminal 100 with a camera lens assembly according to an exemplary embodiment of the present invention, FIG. 2 is a perspective view showing the second housing 102 of the portable terminal 100 shown in FIG. 1, FIG. 3 is a perspective view showing the lens housing 103 of the camera lens assembly of the portable terminal 100 shown in FIG. 1, and FIG. 4 is a front view showing the second housing 102 of the portable terminal 100 shown in FIG. 1 when the lens housing 103 is assembled in the second housing 102.

As shown in FIG. 1, FIG. 2, FIG. 3, and FIG. 4, the portable terminal 100 with a camera lens assembly according to an exemplary embodiment of the present invention is folder-type terminal having a lens housing 103, which is rotatably mounted on a terminal housing.

The portable terminal 100 includes a first housing 101 and a second housing 102, which may be rotated toward or away from the first housing 101.

The first housing 101 includes a key pad 111 and a transmitter unit 113, which are provided on a side thereof and are exposed or covered by the second housing 102, and a pair of side hinge arms 115, which are provided at opposite sides of an end of the first housing 101. The second housing 102 includes a display unit 121 and a receiver unit 123, which are exposed or covered as the second housing 102 rotates, and a center hinge arm 125 formed at an end of the second housing 102. The center hinge arm 125 is rotatably joined between the side hinge arms 115 and the second housing 102 rotates about a hinge axis A1 formed by the side hinge arms 115 and the center hinge arm 125 when they are joined together.

The portable terminal 100 has a receiving groove 117 formed at the central area of the center hinge arm 125 to receive the camera lens assembly. The receiving groove 117 may be formed by cutting away a part of the center hinge arm 125. At least one side of the receiving groove 117 is formed with a plurality of recesses 119, which are distributed around the circumference of the center hinge arm 125. The recesses 119 are formed adjacent to each other and form a complete circle.

The camera lens assembly includes a cylindrical lens housing 103, which houses a camera device. The lens housing 103 includes an exposure member 131, which is formed on the circumference thereof and closed by a transparent member, to enable the camera device to photograph.

The lens housing 103 has a frictional piece 133 provided at an end thereof. The frictional piece 133 may be formed by cutting a part of the end face the lens housing 103 and extends radially from the central area of the end face of the lens housing 103. Therefore, the frictional piece 133 is inwardly or outwardly deformable in relation to the lens housing 103. When the frictional piece 133 is deformed, it accumulates elastic force which attempts to return the frictional piece 133 to its original position.

The frictional piece 133 has a frictional projection 135 formed at an end thereof When the frictional piece 133 is in its original position, the frictional projection 135 projects from the end face of the lens housing 103.

The lens housing 103 has a frictional piece 133 provided at an end thereof. The frictional piece 133 may be formed by cutting a part of the end face of the lens housing 103 and extends radially from the central area of the end face of the lens housing 103. Therefore, the frictional piece 133 is inwardly or outwardly deformable in relation to the lens housing 103. When the frictional piece 133 is deformed, it accumulates elastic force which attempts to return the frictional piece 133 to its original position.

Because the frictional projection 135 projects from one end face of the lens housing 103, when the lens housing 103 rotates, the frictional projection 135 comes into contact with the inner wall of the receiving groove 117. This causes the frictional piece 133 to bend into the lens housing 103 when the lens housing 103 is disposed in the receiving groove 117. Therefore, when the lens housing 103 rotates within the receiving groove 117, the elastic force accumulated in the frictional piece 133 acts on the frictional projection 135, causing the frictional projection 135 to rub against the inner wall of the receiving groove 117.

Here, the recesses 119, formed on the inner wall of the receiving groove 117, may be formed along a moving trace formed by the frictional projection 135 as the lens housing 103 rotates. If the recesses 119 are formed along the moving trace of the frictional projection 135, elastic force accumulated in the frictional piece 133 acts on the frictional projection 135, causing it to become engaged with one of the recesses 119. When the lens housing 103 rotates, the frictional projection 135 disengages from the formerly engage recess and engaged with another recess, which provides a click-feeling. As a result, the user may be able to recognize the rotating angle of the lens housing 103.

In addition, when the frictional projection 135 is engaged with a recess 119, the rotation or movement of the lens housing 103 is limited and as a result, the lens housing 103 may retain a stably fixed state.

When the lens housing 103 is rotatably disposed in the receiving groove 117, it may be possible to guide the rotation of the lens housing 103 if a rib 137 extending along a circular arc at an end of the lens housing 103 and a rotary recess formed on an inside wall of the receiving groove 117 are engaged with each other.

As described above, a portable terminal with the inventive camera lens assembly includes a frictional piece formed by cutting an end face of the lens housing and a frictional projection formed at an end of the frictional piece. The frictional projection is adapted to rub against an inside wall of a receiving groove that receives the lens housing, whereby the fixed state of the lens housing can be stably retained. In addition, by providing a serration structure, which consists of a plurality of recesses formed on the inside wall of the receiving groove that selectively engage the frictional projection, the fixed state of the lens housing may be stabilized, thereby enhancing stability in photographing, and a click-feeling may be provided, thereby allowing a user to easily recognize the rotating degree of the lens housing.

It will be apparent to those skilled in the art that various modifications and variations can be made in the present invention cover the modifications and variations of this invention provided they come within the scope of the appended claims and their equivalents.

What is claimed is:

1. A portable terminal with a camera lens assembly, the portable terminal comprising:
    a receiving groove;
    a lens housing rotatably disposed in the receiving groove;
    a cut part formed at an end face of the lens housing;
    a frictional piece provided in the cut part; and
    a frictional projection provided at an end of the frictional piece,
    wherein the frictional piece extending radially from the center of the end face of the lens housing, and the frictional projection contacts a wall of the receiving groove when the lens housing rotates.

2. The portable terminal of claim 1, wherein, as the frictional projection contacts the wall of the receiving groove, the frictional piece is deformed so as to be bent into the lens housing, thereby accumulating elastic force.

3. The portable terminal of claim 1, further comprising a plurality of recesses on the wall of the receiving groove along a moving trace formed by the frictional projection as the lens housing rotates.

4. The portable terminal of claim 3, wherein the frictional projection engages one of the recesses, thereby limiting rotation of the lens housing.

5. The portable terminal of claim 1, wherein the terminal comprises a folder-type terminal comprising a first housing and a second housing, wherein the second housing is connected to the first housing, such that it is rotatable toward or away from the first housing, and the lens housing is mounted on a hinge axis, the hinge axis being the axis about which the second housing rotates.

6. The portable terminal of claim 5, further comprising:
a pair of side hinge arms disposed at opposite sides of an end of the first housing; and
a center hinge arm disposed on an end of the second housing and rotatably engaged between the side hinge arms, wherein the receiving groove is disposed on the center hinge arm.

* * * * *